US012402229B2

(12) United States Patent
Krajnc et al.

(10) Patent No.: US 12,402,229 B2
(45) Date of Patent: Aug. 26, 2025

(54) CONTROLLER FOR CONTROLLING A LIGHTING SYSTEM

(71) Applicant: SIGNIFY HOLDING B.V., Eindhoven (NL)

(72) Inventors: Hugo Jóse Krajnc, Eindhoven (NL); Berent Willem Meerbeek, Veldhoven (NL); Jérôme Eduard Maes, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 215 days.

(21) Appl. No.: 18/274,562

(22) PCT Filed: Jan. 31, 2022

(86) PCT No.: PCT/EP2022/052169
§ 371 (c)(1),
(2) Date: Jul. 27, 2023

(87) PCT Pub. No.: WO2022/167354
PCT Pub. Date: Aug. 11, 2022

(65) Prior Publication Data

US 2024/0107649 A1 Mar. 28, 2024

(30) Foreign Application Priority Data

Feb. 4, 2021 (EP) .................................... 21155119

(51) Int. Cl.
*H05B 47/19* (2020.01)
*H05B 47/17* (2020.01)

(52) U.S. Cl.
CPC ............ *H05B 47/19* (2020.01); *H05B 47/17* (2020.01)

(58) Field of Classification Search
CPC ...... H05B 47/19; H05B 47/17; H05B 47/196; H05B 47/1965; H05B 47/199
(Continued)

(56) References Cited

U.S. PATENT DOCUMENTS 9,848,479 B2 * 12/2017 Karc .................... H05B 47/196
10,426,017 B2 * 9/2019 Bard ...................... H05B 47/11
(Continued)

FOREIGN PATENT DOCUMENTS

WO 2017140565 A1 8/2017

*Primary Examiner* — Ryan Jager

(57) ABSTRACT

A controller for controlling a lighting system is disclosed. The lighting system comprises a lighting device configured to receive lighting control commands from the controller via a wireless network, and a separate power switching device configured to receive, via the wireless network, power switching control commands from the controller to switch between a first mode wherein a load connected to the power switching device is powered, and a second mode the load connected to the power switching device is unpowered. The controller comprises a transmitter configured to transmit the lighting control commands to the lighting device and configured to transmit the power switching control commands to the power switching device, one or more inputs configured to obtain one or more first signals indicative of that the lighting device is connected to the separate power switching device as the load, and to obtain a second signal indicative of a current mode of the power switching device, and a processor configured to determine that the lighting device is connected to the power switching device based on the one or more first signals, to transmit a lighting control command to the lighting device to control the lighting device, and, if the power switching device is in the second mode, to transmit a power switching control command to the power switching device to switch the power switching device to the first mode.

15 Claims, 4 Drawing Sheets

(58) Field of Classification Search
USPC .......................................................... 315/291
See application file for complete search history.

(56) References Cited

U.S. PATENT DOCUMENTS

| | | | | |
|---|---|---|---|---|
| 10,772,180 | B2 * | 9/2020 | Bhutani .............. | H04L 12/2816 |
| 11,437,814 | B2 * | 9/2022 | Bhutani ................. | H05B 47/20 |
| 2013/0245849 | A1 | 9/2013 | Paul et al. | |
| 2014/0265881 | A1 * | 9/2014 | Karc ....................... | H02J 13/00<br>307/130 |
| 2014/0327311 | A1 | 11/2014 | Brewer et al. | |
| 2015/0189725 | A1 * | 7/2015 | Karc ...................... | H05B 47/19<br>315/291 |
| 2015/0382436 | A1 * | 12/2015 | Kelly ..................... | G08C 17/02<br>315/131 |
| 2016/0043962 | A1 * | 2/2016 | Kim ........................ | H04W 4/80<br>709/224 |
| 2016/0157326 | A1 * | 6/2016 | Kelly ..................... | G08C 17/02<br>315/307 |
| 2016/0349779 | A1 | 12/2016 | Fan et al. | |
| 2017/0354011 | A1 * | 12/2017 | Dimberg ................ | G05B 15/02 |
| 2020/0107085 | A1 | 4/2020 | Choueiter et al. | |
| 2022/0225446 | A1 * | 7/2022 | Kim ...................... | H04L 67/141 |
| 2024/0107649 | A1 * | 3/2024 | Krajnc ................... | H05B 47/19 |

* cited by examiner

CONTROLLER FOR CONTROLLING A LIGHTING SYSTEM

CROSS-REFERENCE TO PRIOR APPLICATIONS

This application is the U.S. National Phase application under 35 U.S.C. § 371 of International Application No. PCT/EP2022/052169, filed on Jan. 31, 2022, which claims the benefit of European Patent Application No. 21155119.7, filed on Feb. 4, 2021. These applications are hereby incorporated by reference herein.

FIELD OF THE INVENTION

The invention relates to a controller for controlling a lighting system. The invention further relates to a lighting system comprising the controller, a lighting device and a separate power switching device. The invention further relates to a method of controlling a lighting system and to a computer program product for executing the method.

BACKGROUND

Home environments typically contain multiple controllable lighting devices for creation of atmosphere, accent or task lighting. These controllable lighting devices may be controlled according to a light setting via a user interface of a control device such as a smartphone, based on sensor input, based on a scheduled lighting routine, etc. Home lighting systems typically comprise different types of devices that are connected via a wireless network, for instance a Zigbee, Bluetooth or Wi-Fi network. Examples of such devices are lighting devices comprising one or more light sources, sensors, connected sockets and connected light switches. These connected sockets and light switches may be configured to provide and interrupt power provided to a load connected to a respective socket/light switch.

US 20150382436 A1 discloses a network device which includes a relay. The relay is a switch that controls whether power is relayed from the line power to an electrical device. The relay may be controlled either manually using a power button or remotely using wireless communication signals.

SUMMARY OF THE INVENTION

The inventors have realized that when a user connects a lighting device to a separate power switching device which can be switched via a wireless network, such as a connected socket or switch, the power to the lighting device may be interrupted when the power switching device is switched to a mode wherein no power is provided to the load connected to the power switching device. Consequently, it is not possible for a user to control the lighting device. It is therefore an object of the present invention to enable control of a lighting device that has been connected to a power switching device which can be switched via a wireless network.

According to a first aspect of the present invention, the object is achieved by a controller for controlling a lighting system, wherein the lighting system comprises:

a lighting device configured to receive lighting control commands from the controller via a wireless network, and a separate power switching device configured to receive, via the wireless network, power switching control commands from the controller to switch between a first mode wherein a load electrically connected to the power switching device is powered, and a second mode wherein the load connected to the power switching device is unpowered, wherein the controller comprises:

a transmitter configured to transmit the lighting control commands to the lighting device and configured to transmit the power switching control commands to the power switching device, one or more inputs configured to obtain one or more first signals indicative of that the lighting device is connected to the separate power switching device, and to obtain a second signal indicative of a current mode of the power switching device, and a processor configured to determine that the lighting device is connected to the power switching device based on the one or more first signals, to transmit a lighting control command to the lighting device to control the lighting device, and, if the power switching device is in the second mode, to transmit a power switching control command to the power switching device to switch the power switching device to the first mode such that the lighting device can receive the lighting control command.

The controller is configured to determine that the lighting device is connected to the separate power switching device based on the input signals received. The power switching device is a separate device connected to the wireless network and configured to provide and interrupt mains power to an electrically connected load. When the processor has determined the presence of this connection, and if the power switching device is in the second mode, the processor transmits, via the transmitter, a power switching control command to the power switching device to switch the power switching device to the first mode. As a result, the power switching device is switched to the first mode such that the power switching device provides power to the load (i.e. the lighting device), such that the load (the lighting device) becomes reachable via the network. This is beneficial because, by determining the presence of the connection between the power switching device and the lighting device and by transmitting the switching control command, control of the lighting device that is connected to the power switching device is enabled. This also improves the user experience when controlling the lighting device, because the power switching device is automatically switched without requiring user input to do so.

The processor may be configured to determine that the lighting device is connected to the power switching device by: determining the presence of a temporal correlation between switching of the power switching device from the first mode to the second mode, or vice versa, and a detectability of the lighting device on the wireless network. The one or more first signals may be indicative of the presence of the lighting device on the wireless network and a power switching of the power switching device from the first mode to the second mode, or vice versa. The processor may be configured to determine presence of devices (e.g. the lighting device and the power switching device) on the network based on signals received from these devices via the one or more inputs. If, upon switching the mode of the power switching device, the detectability of the lighting device on the wireless network changes (e.g. within a predetermined time period, e.g. 500 ms), the processor may interpret this as the temporal correlation between switching of the power switching device from the first mode to the second mode and the detectability of the lighting device on the wireless network. This correlation indicates that the lighting device is connected to the power switching device.

The one or more first signals may be indicative of a last-breath message of the lighting device and indicative of a power switching of the power switching device from the first mode to the second mode, and the processor may be configured to determine that the lighting device is connected to the power switching device by: determining the presence of a temporal correlation between the last-breath message of the lighting device and the switching. If, after switching from the first mode (i.e. the mode wherein the load is powered) to the second mode (i.e. the mode the load is unpowered), the last-breath message has been received (e.g. within a predetermined time period, e.g. 500 ms), the processor may interpret this as the temporal correlation between switching of the power switching device from the first mode to the second mode and the detectability of the lighting device on the wireless network. This correlation indicates that the lighting device is connected to the power switching device.

The one or more first signals may be obtained from a user interface, and the processor may be configured to determine that the lighting device is connected to the power switching device based on user input received via the user interface. The user input may be indicative of that the lighting device is connected to the power switching device. The user may, for example, provide the user input via a user interface of a lighting configuration device running a configuration application for configuring the lighting system.

The one or more first signals may be indicative of locations and/or names of the power switching device and the lighting device, and the processor may be configured to determine that the lighting device is connected to the power switching device based on similarities between locations and/or names of the power switching device and the lighting device. The processor may be configured to analyze the locations and/or names of the devices to identify similarities between a name of the lighting device and a name of the power switching device and/or similarities between a location of the lighting device and a location of the power switching device. If the locations and/or names are (sufficiently) similar, the processor may determine that the lighting device is connected to the power switching device based thereon.

The processor may be configured to control the lighting device and the power switching device upon activation of a light scene, the light scene defining a scene light setting for the lighting device and a power setting for the power switching device, the power setting causing the power switching device to be set to the first mode, and the processor may be further configured to transmit the lighting control command (indicative of the scene light setting) after the switching control command (indicative of the power setting). The processor may thus first switch the power switching device to the first mode and then control the lighting device according to the scene light setting defined by the light scene.

The processor may be configured to transmit the lighting control command after transmitting the switching control command. Alternatively, the processor may be configured to transmit the switching control command and the lighting control command to the power switching device, and cause the power switching device to forward the lighting control command to the lighting device when the power switching device has been set to the first mode. The power supply may for example forward the lighting control command to the lighting device via the wireless network, via a wireless protocol different from the protocol used by the controller, or for example via PLC (Power Line Communication). The switching control command and the lighting control command may be comprised in a single message transmitted to the power switching device. Alternatively, the switching control command and the lighting control command may be comprised in separate messages transmitted to the power switching device.

The lighting system may further comprise a further lighting device, and, upon activation of a light scene defining a first light setting for the lighting device and a second light setting for the further lighting device, the processor may be configured to refrain from transmitting the switching control command to the power switching device. It may not be necessary to control the lighting device if the further lighting device is already controlled, for instance when the light scene is used as a night light, or if the light effect of the first light setting has a low impact on the overall illumination of the space.

The processor may be further configured to refrain from transmitting the switching control command to the power switching device if a difference between the first light setting and the second light setting exceeds a threshold. If, for example, the second light setting has a high brightness compared to the first light setting, it may not be necessary to set the lighting device to the first light setting.

The processor may be further configured to determine that a power-switch light setting has been set for the lighting device, the power-switch light setting being a light setting that is activated when the lighting device is power switched, and the processor may be configured to refrain from transmitting the switching control command to the power switching device if a difference between the power-switch light setting and the first light setting exceeds a threshold. The power-switch light setting is a light setting (e.g. a default light setting, a user-defined light setting, etc., stored in a memory of the lighting device) that is activated when the lighting device is switched from a non-powered state to a powered state. If the difference between the power-switch light setting and the first light setting exceeds a threshold (e.g. when the difference is greater than a threshold difference), the processor may determine not to switch the power switching device because this may negatively impact the illumination of the space.

The processor may be further configured to determine that a power-switch light setting has been set for the lighting device, and to adjust the power-switch light setting of the lighting device by communicating an adjusted power-switch light setting to the lighting device. The adjusted power-switch light setting may, for example, be a light setting with a low or lowest brightness, or a light setting with an average brightness. This is beneficial, because when the lighting device is power-switched by the power switching device, the first light setting that is applied to the lighting device is the adjusted power-switch light setting.

According to a second aspect of the present invention, the object is achieved by a lighting system comprising:

- a controller according to the controller of any preceding claim,
- a lighting device configured to receive lighting control commands from the controller via a wireless network, and a separate power switching device configured to receive, via the wireless network, power switching control commands from the controller to switch between a first mode wherein the power switching device is configured to provide power to a load connected to the power switching device, and a second mode wherein the power switching device is configured to provide no power to the load connected to the power switching device.

According to a third aspect of the present invention, the object is achieved by a method of controlling a lighting system, wherein the lighting system comprises:

a lighting device configured to receive lighting control commands from the controller via a wireless network, and a separate power switching device configured to receive, via the wireless network, power switching control commands from the controller to switch between a first mode wherein a load electrically connected to the power switching device is powered, and a second mode the load connected to the power switching device is unpowered, wherein the method comprises:

obtaining one or more first signals indicative of that the lighting device is connected to the separate power switching device as the load, obtaining a second signal indicative of a current mode of the power switching device, determining that the lighting device is connected to the power switching device based on the one or more first signals, transmitting a lighting control command to the lighting device to control the lighting device, and, if the power switching device is in the second mode, transmitting a power switching control command to the power switching device to switch the power switching device to the first mode, such that the lighting device can receive the lighting control command.

According to a fourth aspect of the present invention, the object is achieved by a computer program product for a computing device, the computer program product comprising computer program code to perform the method when the computer program product is run on a processing unit of the computing device.

It should be understood that the lighting system, the method and the computer program product may have similar and/or identical embodiments and advantages as the above-mentioned controllers.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
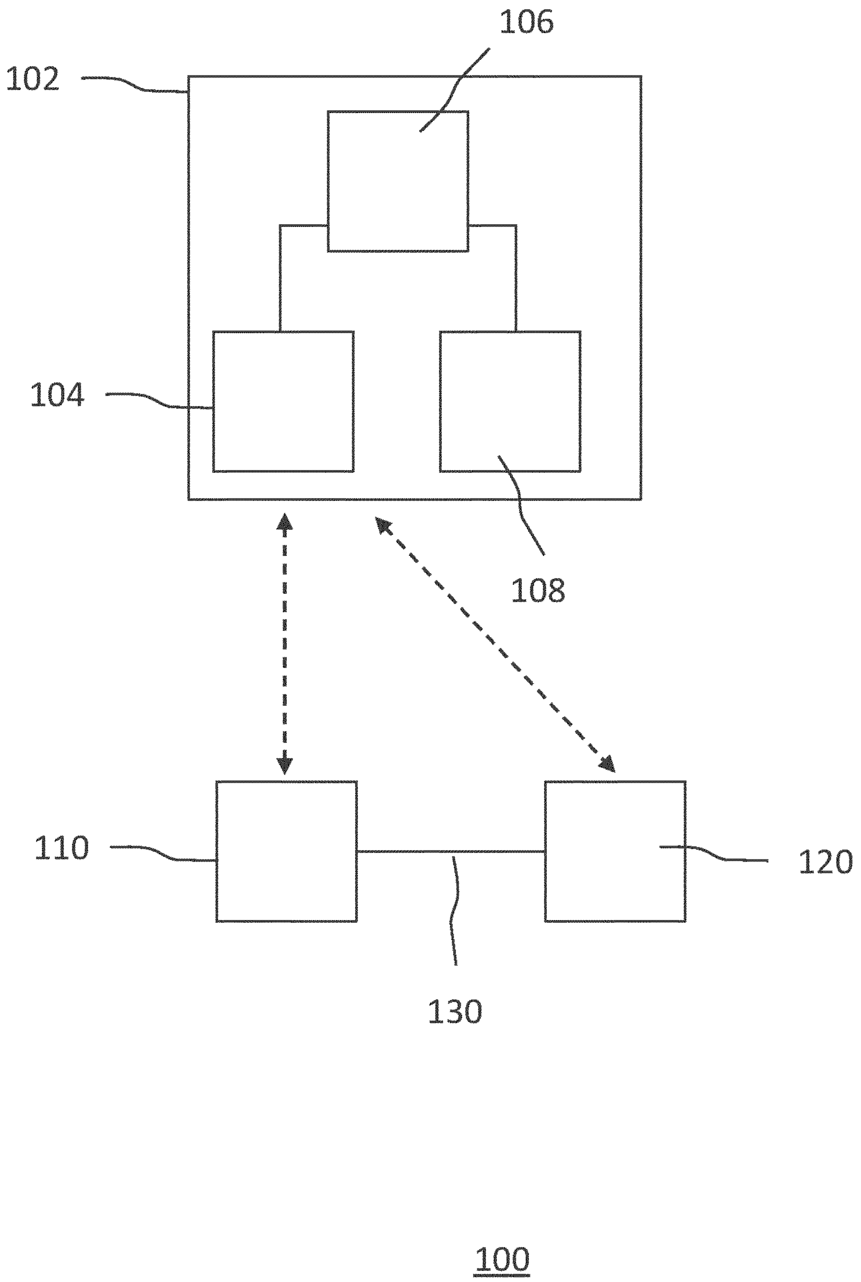
FIG. 1 shows schematically an example of a lighting system comprising a controller for controlling the lighting system.

FIG. 1 shows a lighting system 100 comprising a controller 102, a lighting device 110 and a separate power switching device 120. The controller 102, the lighting device 110 and the power supply 120 are connected via a wireless network (e.g. via Wi-Fi, Zigbee, Bluetooth, Thread, Z-Wave, etc. or via a combination thereof). The controller 102 is configured to control the lighting device 110 by transmitting lighting control commands to the lighting device 110. The lighting device 110 is configured to receive lighting control commands from the controller 102 via the wireless network. The controller 102 is also configured to control the power switching device 120 by transmitting power switching control commands to the power switching device 120. The power switching device 120 is configured to receive, via the wireless network, power switching control commands from the controller 102. The power switching control commands may switch the power switching device between a first mode, wherein the power switching device 120 provides (AC mains) power to a load (e.g. the lighting device 110) electrically (and physically) connected to the power switching device 120, and a second mode wherein the load is unpowered by the power switching device. In the second mode, the power switching device 120 may provide no (AC mains) power to the load connected to the power switching device, or at least not enough power for the load to be switched on by the power switching device. For instance, the power provided may be enough to power a radio (e.g. a receiver) in the lighting device 110, but insufficient to power the lighting device for it to switch on its light sources.

The controller 102 comprises a transmitter 104 configured to transmit the lighting control commands to the lighting device 110 and configured to transmit the power switching control commands to the power switching device 120 via the wireless network. The controller 102 further comprises one or more inputs 108 configured to obtain one or more first signals indicative of that the lighting device 110 is connected to the separate power switching device 120 as the load, and to obtain a second signal indicative of a current mode of the power switching device 120. The one or more inputs 108 may be one or more inputs of the processor 106, and the first and/or second signals may be obtained from a memory which may be comprised in the controller 102. The controller 102 may, for example, store first information indicative of that the lighting device 110 is connected to the separate power switching device 120 and/or second information indicative of the current mode of the power switching device 120. Additionally or alternatively, the one or more inputs 108 may be a receiver configured to obtain the one or more first signals from external devices, such as from the lighting device 110, the power switching device 120 an intermediary device 200, etc. The receiver may be configured to obtain the second signal from an external device, such as from the power switching device 120, an intermediary device 200, etc. The controller 102 may comprise multiple different inputs 108, for example an input to the processor 106 for obtaining the one or more first signals and a receiver for obtaining the second signal, or vice versa. In examples wherein the input 108 is a receiver, the receiver may be configured to obtain the one or more first and/or second signals via the wireless network. The receiver and the transmitter 104 may be comprised in a transceiver configured to communicate via the wireless network. It should be noted that these are examples of the one or more inputs 108, and that, depending on the system architecture, the skilled person is able to design alternatives without departing from the scope of the appended claims.

The controller 102 further comprises a processor 106 (e.g. a microcontroller, a microchip, circuitry). The processor 106 is configured to determine that the lighting device 110 is connected 130 to the power switching device 120 based on the one or more first signals. Examples of determining that the lighting device 110 is connected 130 to the power switching device 120 are described below.

The processor 106 is further configured to transmit a lighting control command to the lighting device 110 to control the lighting device 110. The lighting control command may comprise a light setting (lighting control instructions) for controlling the light output, such as the color, intensity, saturation, beam size, beam shape, etc. of one or more (LED) light sources of the lighting device 110. The lighting device 110 comprises a receiver (not shown) configured to receive the lighting control command from the controller 102 via the wireless network. The lighting device 110 further comprises one or more (LED) light sources, and is configured to control the one or more light sources based on the lighting control command.

The processor 106 is further configured to transmit, if the processor 106 has determined that the power switching device 120 is in the second mode, a power switching control command to the power switching device 120 to switch the power switching device 120 to the first mode, such that the power switching device 120 provides power to the lighting device 110 (and thereby power-switching the lighting device such that the lighting device 110 can receive (receives) lighting control commands from the controller 102). The power switching device 120 comprises a receiver (not shown) configured to receive the switching control command from the controller 102 via the wireless network. The power switching device 120 (e.g. a light switch, an AC power socket for receiving a plug) is configured to switch to the first mode based on the switching control command. Additionally, the power switching device 120 configured to switch to the second mode when a switching control command indicative thereof has been received.

Figure 2:
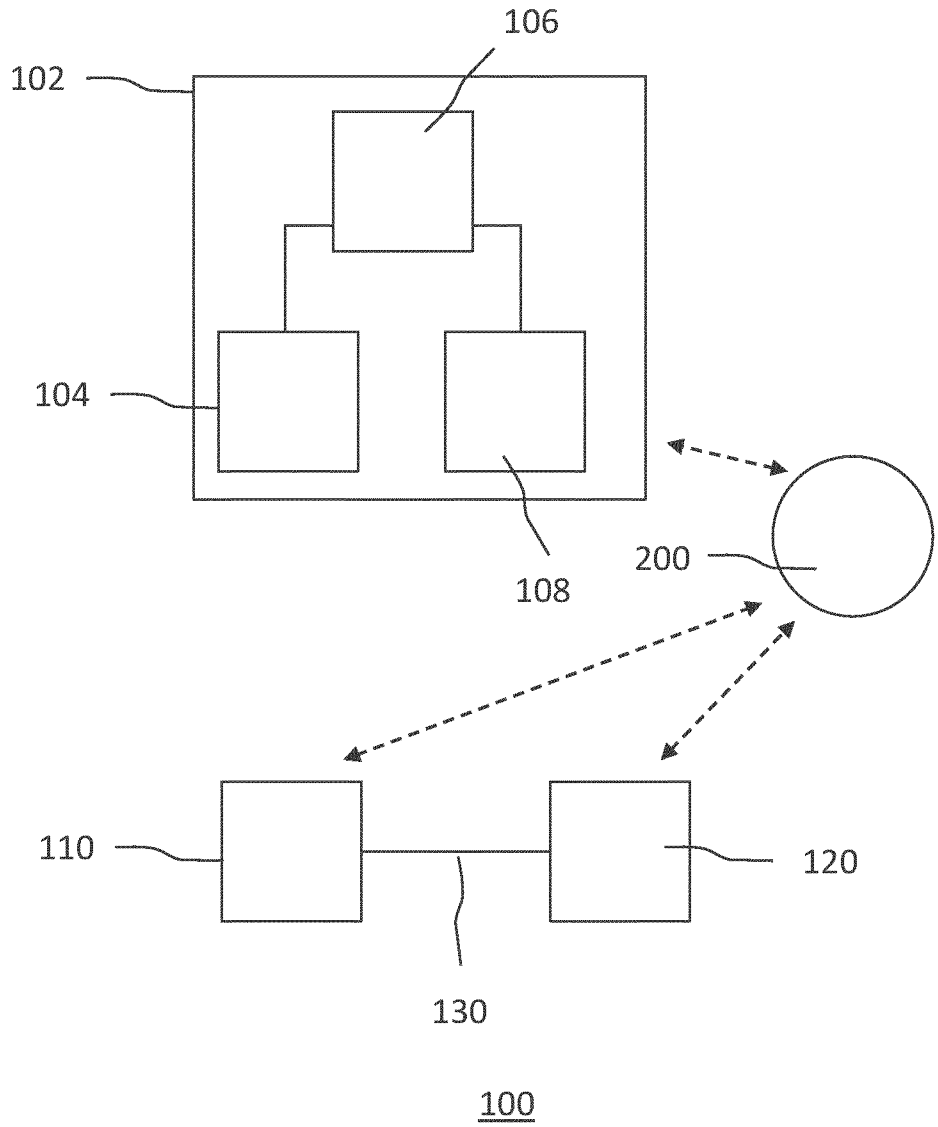
FIG. 2 shows schematically an example of a lighting system comprising a controller for controlling the lighting system and an intermediary device.
Figure 3:
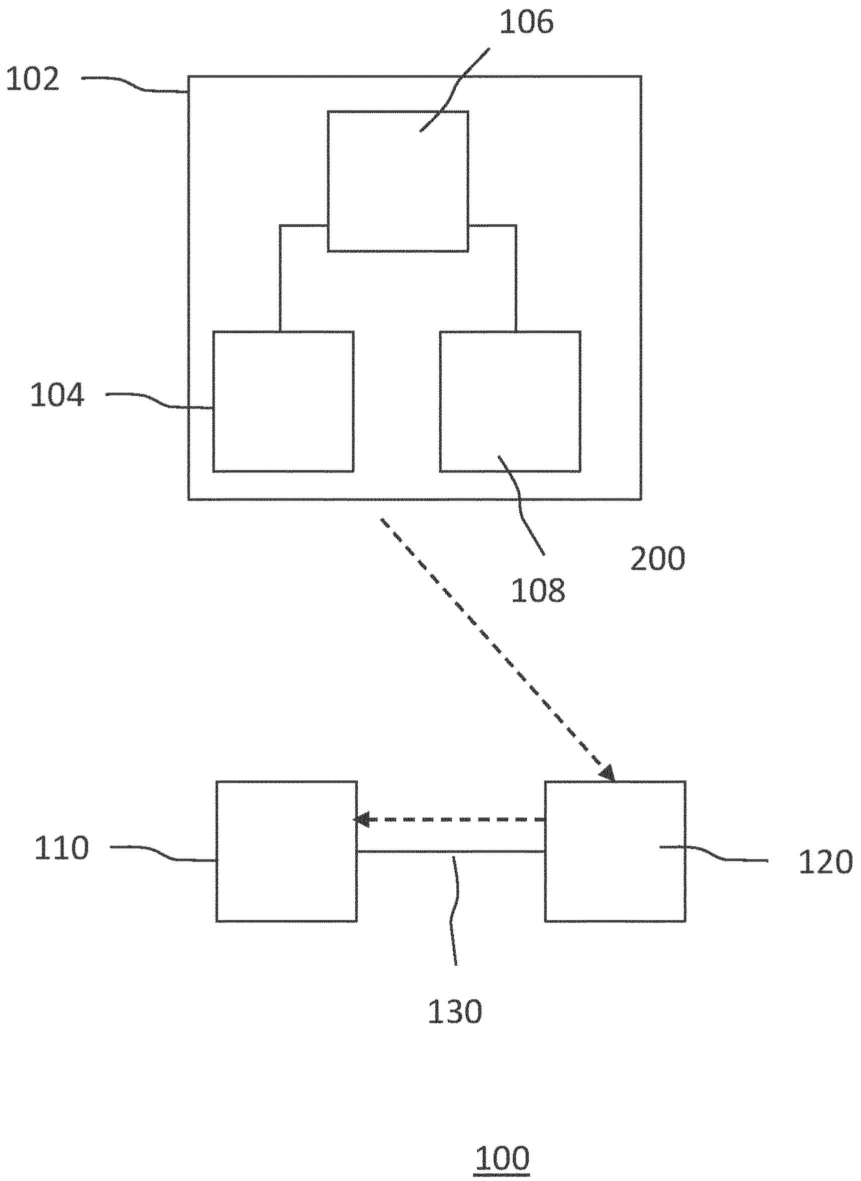
FIG. 3 shows schematically an example of a lighting system comprising a power switching device for forwarding a lighting control command to a lighting device.

FIGS. 1-3 illustrate examples of system architectures of the lighting system 100. In the example of FIG. 1, the control device 102 may communicate the lighting control command directly to the lighting device 110, and communicate the switching control command directly to the power switching device 120. The control device 102 may, for example, be a smartphone, a central (home) control system, a cloud-based control system, etc. In the example of FIG. 2, the lighting system 100 may further comprise an intermediary device 200, such as a bridge, a gateway, a hub, etc., and the control device 102 may be configured to communicate the lighting control command to the lighting device 110 and the switching control command to the power switching device 120 via the intermediary device 200. The controller 102 may, for example, communicate with the intermediary device 200 via a first protocol (e.g. Wi-Fi) and the intermediary device 200 may be configured to communicate with the lighting device 110 and the power switching device 120 via a second protocol (e.g. Zigbee). Alternatively, the controller 102 and the intermediary device 200 may communicate via the same protocol. In the example of FIG. 3, the controller 102 may be configured to communicate the lighting control command and the switching control command to the power switching device 120 (either directly, or via an intermediary device 200 (not shown)) via the wireless network. The power switching device 120 may be configured to communicate (e.g. forward) the lighting control command to the lighting device 120, for instance via the wireless network, via a protocol different from the protocol used by the controller, or via PLC. It should be noted that these are examples of the system architecture, and that the skilled person is able to design alternatives without departing from the scope of the appended claims.

The processor 106 may be configured to determine that the lighting device 110 is connected to the power switching device 120 in one or more different ways.

For example, the one or more first signals may be indicative of the presence of the lighting device 110 on the wireless network and a power switching of the power switching device 120 from the first mode to the second mode, or vice versa. The processor 106 may be configured to determine presence of devices (e.g. the lighting device 110 and the power switching device 120) on the network based on signals received from the these devices via the one or more inputs 108 (e.g. via the receiver). The processor 106 may be configured to determine that the lighting device 110 is connected to the power switching device 120 by determining the presence of a temporal correlation between switching of the power switching device 120 from the first mode to the second mode, or vice versa, and a detectability of the lighting device 110 on the wireless network. The processor 106 may obtain information about a change of the mode of the power switching device 120 via the one or more inputs, for instance via the receiver or by accessing a memory storing information about the current mode of the power switching device 120. If, upon switching from the first mode to the second mode, the lighting device 110 is no longer detectable on the wireless network (e.g. within a predetermined time period, e.g. 500 ms, 1000 ms or 2000 ms), the processor 106 may interpret this as the temporal correlation between switching of the power switching device 120 from the first mode to the second mode and the detectability of the lighting device 110 on the wireless network. This correlation indicates that the lighting device 110 is connected to the power switching device 120. If, upon switching from the second mode to the first mode, the lighting device 110 appears on the wireless network (e.g. within a predetermined time period, e.g. 500 ms, 1000 ms or 2000ms), the processor 106 may interpret this as the temporal correlation between switching of the power switching device 120 from the second mode to the first mode and the detectability of the lighting device 110 on the wireless network. This correlation indicates that the lighting device 110 is connected to the power switching device 120.

Additionally or alternatively, the one or more first signals may be indicative of a last-breath message of the lighting device 110 and a power switching of the power switching device 120 from the first mode to the second mode. The processor 106 may be configured to determine that the lighting device is connected to the power switching device by determining the presence of a temporal correlation between the last-breath message of the lighting device and the switching. The last breath message may for example be received from the lighting device 110, from the power switching device 120 (which may have received the last breath message from the lighting device 110 via the wireless network, via a protocol different from the protocol used by the controller, or via for example PLC) or from an intermediary device 200. If, after switching from the first mode (i.e. the mode wherein the power is provided to the load) to the second mode (i.e. the mode wherein no power is supplied to the load), the last-breath message has been received (e.g. within a predetermined time period, e.g. 500 ms), the processor 106 may interpret this as the temporal correlation between switching of the power switching device 120 from the first mode to the second mode and the detectability of the lighting device on the wireless network. This correlation indicates that the lighting device 110 is connected to the power switching device 120.

Additionally or alternatively, the one or more first signals indicative of that the lighting device 110 is connected to the separate power switching device 120 may be obtained from a user interface. The user interface may be a user interface of a lighting configuration device running a configuration application for configuring the lighting system. The user may provide user input to associate the lighting device 110 with the power switching device 120 in the user interface to indicate that the lighting device 110 is connected to the separate power switching device 120. The processor 106 may be configured to determine that the lighting device 110 is connected to the power switching device 120 based thereon.

Additionally or alternatively, the one or more first signals may be indicative of locations and/or names of the power switching device 120 and the lighting device 110, and the processor may be configured to determine that the lighting device is connected to the power switching device based on similarities between locations and/or names of the power switching device 120 and the lighting device 110.

The locations of the power switching device 120 and the lighting device 110 may be obtained from an (indoor) positioning system such as an RF-based positioning system, a VLC based positioning system, based on user input received via a user interface of a commissioning application, etc. The one or more first signals indicative of the locations of the power switching device 120 and the lighting device 110 may be obtained from the power switching device 120 and the lighting device 110, from a (local or remote) memory storing information indicative of the locations of the power switching device 120 and the lighting device 110, etc. Techniques for determining and storing locations of devices in a space/building are known in the art and will therefore not be discussed in detail. If, for example, the one or more first signals are indicative of that the power switching device 120 and the lighting device 110 are located in the same area (e.g. the same room) or the same subarea (e.g. in the same part of a room), the processor 106 may use this information to determine (or estimate) that the power switching device 120 and the lighting device 110 are connected.

The one or more first signals may be indicative of the names of the power switching device 120 and the lighting device 110, which may be obtained from the power switching device 120 and the lighting device 110, from a (local or remote) memory storing information indicative of the names of the power switching device 120 and the lighting device 110, from a lighting control application, etc. The names may be logical names, which may be descriptive of the location (e.g. living room lamp 1, living room wall washer 1, kitchen spotlight 2, etc.). The names may have been defined by a user via a lighting system configuration application. The processor 106 may be configured to analyze the names of the devices to identify similarities between a name of the lighting device 110 and a name of the power switching device 120. If, for example, the one or more first signals are indicative of that the power switching device 120 and the lighting device 110 have similar names (e.g. names referring to same room), the processor 106 may use this information to determine (or estimate) that the power switching device 120 and the lighting device 110 are connected.

The processor 106 may be configured to control the lighting device 110 and the power switching device 120 upon activation of a light scene. The light scene may define a scene light setting (e.g. a first color and/or a first intensity) for the lighting device 110 and a power setting (e.g. "on") for the power switching device 120. In other words, both the lighting device 110 and the power switching device 120 are 'part' of the light scene. The light scene may, for example, be triggered by a user (e.g. via a user interface, via a light switch, based on a voice command, etc.), be triggered by a timer/routine, be triggered by a sensor, etc. The power setting may cause the power switching device 120 to be set to the first mode. The processor 102 may therefore be further configured to transmit the lighting control command after the switching control command has been sent to the power switching device 120, such that the lighting device 110 becomes reachable via the network.

The processor 102 may be configured to transmit the lighting control command after transmitting the switching control command, such that the lighting device 110 becomes reachable via the network before the lighting control command is sent. In another example, the processor 102 may be configured to transmit the switching control command and the lighting control command to the power switching device 120, and cause the power switching device to forward the lighting control command to the lighting device 110 when the power switching device 120 has been set to the first mode. This has been illustrated in the example of FIG. 3. The power switching device 120 may forward the lighting control command to the lighting device 110 via the wireless network, or via, for example, PLC via the AC mains power. The switching control command and the lighting control command may be comprised in a single message transmitted to the power switching device 120. Alternatively, the switching control command and the lighting control command may be comprised in separate messages transmitted to the power switching device 120.

The lighting system 100 may further comprise a further (second) lighting device. The second lighting device may, for example, be installed in the same area as the (first) lighting device 110. A light scene defining a first light setting for the (first) lighting device 110 and a second light setting for the further (second) lighting device may be triggered (e.g. by a user, by a timer, etc.). The processor 102 may be configured to, upon activation of the light scene, determine to refrain from transmitting the switching control command to the power switching device 120. Additionally, the processor 102 may determine to refrain from transmitting the lighting control command (indicative of the first light setting as defined by the light scene) to the lighting device 110. It may not be necessary to control the first lighting device 110 if the second lighting device is already controlled, for instance when the light scene is used as a night light, or if the light effect of the first light setting has a low impact on the overall illumination of the space. The processor 102 may be configured to refrain from transmitting the switching control command to the power switching device 120 (and optionally the lighting control command) if a difference between the first light setting and the second light setting exceeds a threshold. The processor 102 may be configured to determine the difference between the first and second light setting. If, for example, the second light setting has a high brightness (e.g. 80%) compared to the first light setting (e.g. 10%), it may not be necessary to set the lighting device 110 to the first light setting. If, for example, the second light setting has a high brightness (e.g. 80%) compared to the first light setting (e.g. 10%), it may not be necessary to set the lighting device 110 to the first light setting.

The processor 102 may be configured to refrain from transmitting the switching control command to the power switching device 120 (and optionally the lighting control command) if the first light setting and the second light setting are similar. The processor 102 may be configured to determine the difference between the first and second light setting. If, for example, the second light setting has a color (e.g. RGB 216,31,42 (red)) similar to the first light setting (e.g. RGB 202,0,42 (red)), it may not be necessary to set the lighting device 110 to the first light setting. If, for example, the second light setting has a high brightness (e.g. 80%) compared to the first light setting (e.g. 10%), it may not be necessary to set the lighting device 110 to the first light setting.

The processor 102 may be further configured to refrain from transmitting the switching control command (and optionally the lighting control command) to the power switching device 120 if a number of lighting devices defined in the light scene exceeds a threshold. If, for example, the scene light scene defines light settings for three (or five) or more lighting devices, it may not be necessary to set the lighting device 110 to the first light setting, because the other lighting devices already create the scene.

A power-switch light setting for the lighting device 110 may have been set. The power-switch light setting may be a light setting that is activated when the lighting device is switched from a non-powered state to a powered state (i.e. when the lighting device is switched and receives AC mains power). The power-switch light setting may be a default light setting (e.g. 100% brightness), a user-defined light setting, etc., which may be stored in a memory of the lighting device 110. The processor 102 may be configured to determine that a power-switch light setting has been set for the lighting device 110, for instance by accessing a local or remote memory storing information about power-switch light settings of lighting devices, by requesting power-switch light setting information from a lighting control app, by requesting the power-switch light setting from the lighting device 110, etc. The processor 102 may be configured to refrain from transmitting the switching control command to the power switching device 120 if a difference between the power-switch light setting and the first light setting exceeds a threshold. that is activated when the lighting device 110 is the difference between the power-switch light setting and the first light setting exceeds a threshold (i.e. when the difference is greater than a threshold difference), the processor 106 may determine not to switch the power switching device 120 because this may negatively impact the illumination of the space.

Additionally or alternatively, the processor 102 may be configured to determine that a power-switch light setting has been set for the lighting device 110, and adjust the power-switch light setting of the lighting device 110 by communicating an adjusted power-switch light setting to the lighting device 110. The adjusted power-switch light setting may, for example, be a light setting with a low or lowest brightness (e.g. 10%), or a light setting with an average brightness (e.g. 50%, an average color of a set of frequently used colors, an average brightness of a set of frequently used light settings, etc.), a white color, etc. Thus, when the lighting device is power-switched by the power switching device 120, the first light setting that is applied to the lighting device 120 is the adjusted power-switch light setting, and subsequently the light setting defined by the lighting control command.

Figure 4:
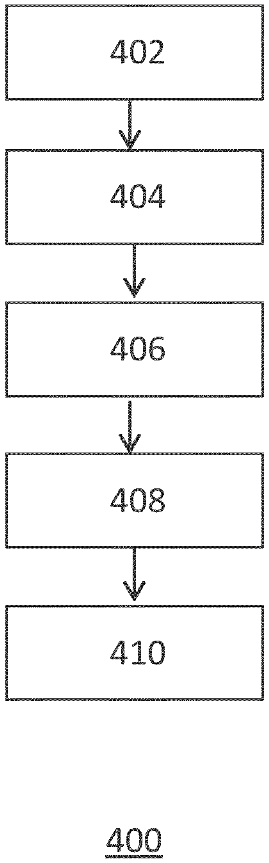
FIG. 4 shows schematically a method of controlling a lighting system.

FIG. 4 shows schematically a method 400 of controlling a lighting system 100. The lighting system comprises a lighting device configured to receive lighting control commands from the controller via a wireless network. The lighting system further comprises a separate power switching device configured to receive, via the wireless network, power switching control commands from the controller to switch between a first mode wherein a load connected to the power switching device is powered, and a second mode the load connected to the power switching device is unpowered. The method comprises:

obtaining 402 one or more first signals indicative of that the lighting device is connected to the separate power switching device as the load, obtaining 404 a second signal indicative of a current mode of the power switching device, determining 406 that the lighting device is connected to the power switching device based on the one or more first signals, transmitting 408 a lighting control command to the lighting device to control the lighting device, and, if the power switching device is in the second mode, transmitting 410 a power switching control command to the power switching device to switch the power switching device to the first mode.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A controller for controlling a lighting system, wherein the lighting system comprises:

a lighting device configured to receive lighting control commands from the controller via a wireless network, and a separate power switching device, configured to receive, via the wireless network, power switching control commands from the controller to switch between a first mode wherein a load electrically connected to the power switching device is powered, and a second mode, wherein the load connected to the power switching device is unpowered, wherein the controller comprises:

a transmitter configured to transmit the lighting control commands to the lighting device and configured to transmit the power switching control commands to the power switching device, one or more inputs configured to obtain one or more first signals indicative of that the lighting device is connected to the separate power switching device as the load, and to obtain a second signal indicative of a current mode of the power switching device being the first or the second mode, and a processor configured to determine that the lighting device is connected to the power switching device based on the one or more first signals, to transmit a lighting control command to the lighting device to control the lighting device, and, if the power switching device is in the second mode, to transmit a power switching control command to the power switching device to switch the power switching device to the first mode such that the lighting device can receive the lighting control command.

2. The controller of claim 1, wherein the processor is configured to determine that the lighting device is connected to the power switching device by: determining the presence of a temporal correlation between switching of the power switching device from the first mode to the second mode, or vice versa, and a detectability of the lighting device on the wireless network.

3. The controller of claim 1, wherein the one or more first signals are indicative of a last-breath message of the lighting device and a power switching of the power switching device from the first mode to the second mode, and wherein the processor is configured to determine that the lighting device is connected to the power switching device by: determining the presence of a temporal correlation between the last-breath message of the lighting device and the switching.

4. The controller of claim 1, wherein the one or more first signals are obtained from a user interface, and wherein the processor is configured to determine that the lighting device is connected to the power switching device based on user input received via the user interface.

5. The controller of claim 1, wherein the one or more first signals are indicative of locations and/or names of the power switching device and the lighting device, and wherein the processor is configured to determine that the lighting device is connected to the power switching device based on similarities between locations and/or names of the power switching device and the lighting device.

6. The controller of claim 1, wherein the processor is configured to transmit the lighting control command after transmitting the switching control command.

7. The controller of claim 1, wherein the processor is configured to control the lighting device and the power switching device upon activation of a light scene, the light scene defining a scene light setting for the lighting device and a setting for the power switching device, the setting switching the power switching device to the first mode.

8. The controller of claim 1, wherein the processor is configured to transmit the switching control command and the lighting control command to the power switching device, and cause the power switching device to forward the lighting control command to the lighting device when the power switching device has been set to the first mode.

9. The controller of claim 8, wherein the switching control command and the lighting control command are comprised in a single message transmitted to the power switching device.

10. The controller of claim 1, wherein the lighting system comprises a further lighting device, and wherein, upon activation of a light scene defining a first light setting for the lighting device and a second light setting for the further lighting device, the processor is configured to refrain from transmitting the switching control command to the power switching device.

11. The controller of claim 10, wherein the processor is configured to refrain from transmitting the switching control command to the power switching device if a difference between the first light setting and the second light setting exceeds a threshold.

12. The controller of claim 10, wherein the processor is configured to determine that a power-switch light setting has been set for the lighting device, the power-switch light setting being a light setting that is activated when the lighting device is power switched, and wherein the processor is configured to refrain from transmitting the switching control command to the power switching device if a difference between the power-switch light setting and the first light setting exceeds a threshold.

13. The controller of claim 1, wherein the processor is configured to determine that a power-switch light setting has been set for the lighting device, the power-switch light setting being a light setting that is activated when the lighting device is power switched, and to adjust the power-switch light setting of the lighting device by communicating an adjusted power-switch light setting to the lighting device.

14. A method of controlling a lighting system, wherein the lighting system comprises:

a lighting device configured to receive lighting control commands from the controller via a wireless network, and a separate power switching device configured to receive, via the wireless network, power switching control commands from the controller to switch between a first mode wherein a load electrically connected to the power switching device is powered, and a second mode, wherein the load connected to the power switching device is unpowered, wherein the method comprises:

obtaining one or more first signals indicative of that the lighting device is connected to the separate power switching device as the load, obtaining a second signal indicative of a current mode of the power switching device being the first or the second mode, determining that the lighting device is connected to the power switching device based on the one or more first signals, transmitting a lighting control command to the lighting device to control the lighting device, and, if the power switching device is in the second mode, transmitting a power switching control command to the power switching device to switch the power switching device to the first mode such that the lighting device can receive the lighting control command.

15. A non-transitory computer readable medium of a computing device comprising instructions to perform the method of claim 14 when the instructions are executed by a processing unit of the computing device.

* * * * *